United States Patent [19]

Russell et al.

[11] Patent Number: 5,244,401
[45] Date of Patent: Sep. 14, 1993

[54] MULTI-TIERED ELECTRICAL SYSTEM FOR FURNITURE

[75] Inventors: Scott H. Russell, Kalamazoo; George V. Weller, Grand Rapids, both of Mich.

[73] Assignee: Steelcase Inc., Grand Rapids, Mich.

[21] Appl. No.: 985,872

[22] Filed: Dec. 4, 1992

[51] Int. Cl.[5] .............................................. H01R 4/60
[52] U.S. Cl. ....................................... 439/215; 174/48
[58] Field of Search ............... 439/207, 209, 211, 212, 439/215; 174/48, 49, 70

[56] References Cited

U.S. PATENT DOCUMENTS

| | | | |
|---|---|---|---|
| 1,718,252 | 6/1929 | Putnam . | |
| 1,718,253 | 6/1929 | Putnam . | |
| 2,313,960 | 3/1943 | O'Brien | 173/334.1 |
| 2,947,041 | 8/1960 | Imbrecht | 20/4 |
| 3,248,576 | 4/1966 | Russell | 307/147 |
| 4,224,769 | 9/1980 | Ball et al. | 52/35 |
| 4,386,333 | 5/1983 | Dillan | 336/107 |
| 4,535,577 | 8/1985 | Tenser et al. | 52/221 |
| 4,559,410 | 12/1985 | Hostetter | 174/48 |
| 4,713,918 | 12/1987 | Cioffi | 52/221 |
| 4,800,695 | 5/1989 | Menchetti | 52/221 |
| 4,808,768 | 2/1989 | Sireci | 174/48 |
| 5,065,556 | 11/1991 | DeLong et al. | 52/221 |
| 5,092,786 | 3/1992 | Juhlin et al. | 439/215 |
| 5,112,240 | 5/1992 | Nienhuis et al. | 439/215 |

FOREIGN PATENT DOCUMENTS 517648 2/1940 United Kingdom .

*Primary Examiner*—Eugene F. Desmond
*Attorney, Agent, or Firm*—Price, Heneveld, Cooper, DeWitt & Litton

[57] ABSTRACT

A multi-tiered electrical system is provided for furniture arrangements and the like of the type having a plurality of individual furniture units interconnected side-by-side. A branch raceway extends along each furniture unit, and houses therein an associated branch powerway, which is connected with adjacent branch powerways to create a branch circuit. Power taps are connected to the branch circuit to provide conventional low current power to electrical appliances. A feeder raceway extends adjacent each branch raceway, and houses therein a feeder harness that is connected by a power-in connector to a source of high current electrical power. A power jumper interconnects the feeder harness with one of the branch powerways, such that multiple branch circuits can be powered by a single power-in connector through the feeder harness.

30 Claims, 2 Drawing Sheets

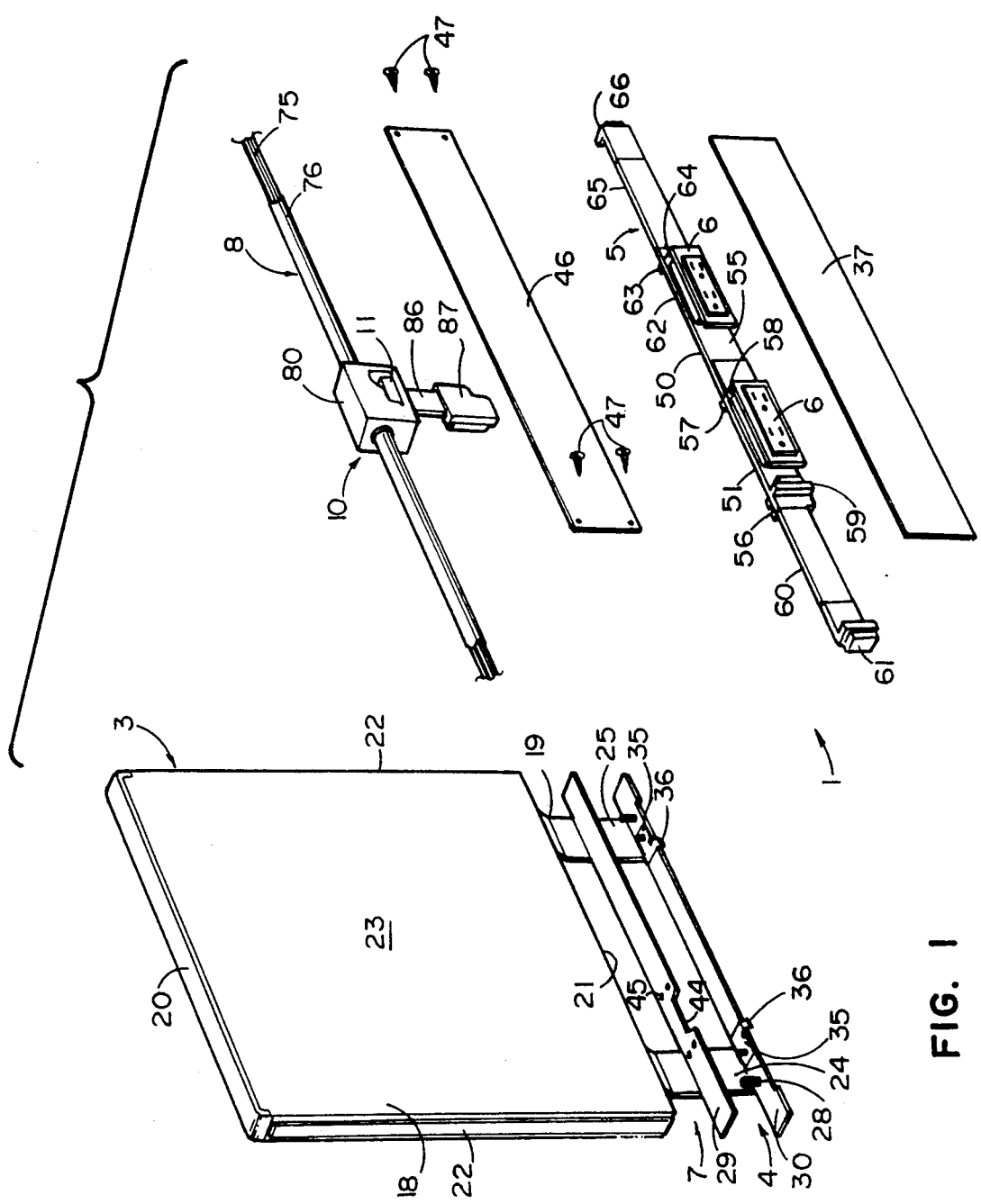

MULTI-TIERED ELECTRICAL SYSTEM FOR FURNITURE

BACKGROUND OF THE INVENTION

The present invention relates to the electrification of office furniture and the like, and in particular to a multi-tiered electrical system therefor.

Open office plans are well known in the art, and generally comprise large, open floor spaces that are divided into individual offices or workstations. Several different furniture arrangements are presently available to divide open office space, including partition panels, systems furniture, and modular furniture. Such office furniture is preferably capable of being electrified in some fashion, so as to provide electrical power at the various workstations for computers, typewriters, dictating equipment, and other electrical appliances.

Many different wiring systems for such office furniture units are currently available. Office furniture wiring systems employ different techniques and arrangements to conduct electrical power through the office furniture units, and to electrically interconnect adjacent office furniture units. Convenience and versatility in both in-line and branched configurations are important design considerations, as well as electrical integrity, durability and overall safety.

The number of electrical taps or outlets that can be connected with a single circuit or power line in a furniture system is normally quite limited due to code requirements, and other similar factors. Hence, in areas of high power usage, multiple power-in lines must typically be run from the building source into the furniture system to provide adequate power. Such power-in lines are normally run downwardly from the building ceiling and/or upwardly through the building floor, which can detract rather substantially from the appearance or aesthetic plan of the office space. Also, because power-in passageways through the building floor can adversely affect its structural integrity, they are normally restricted in number and location, and may even be prohibited, particularly in older and/or heavily used spaces in which the furniture has already been reconfigured several times Both ceiling and floor power-in points are also rather expensive to provide, and therefore reduce the overall cost effectiveness of the furniture system.

SUMMARY OF THE INVENTION

One aspect of the present invention is to provide a multi-tiered electrical system for furniture arrangements and the like. A branch raceway extends along each furniture unit, and houses therein an associated branch powerway where power access is desired, which is connected with adjacent branch powerways to create a branch circuit Power taps are connected to the branch circuit to provide conventional low current power to electrical appliances. A feeder raceway extends adjacent at least a portion of the branch raceway, and houses therein a feeder harness that is connected by a power-in connector to a source of high current electrical power. A power jumper interconnects the feeder harness with one of the branch powerways, such that multiple branch circuits can be powered by a single power-in connector through the feeder harness.

The principal objects of the present invention are to provide a multi-tiered electrical system for furniture arrangements and the like, which reduces the number of requisite power-in points from the building source, so as to improve ease of installation and reduce the associated costs. The electrical system is quite versatile, reliable and durable, as well as safe. The electrical system is particularly beneficial in upgrading the electrical power capabilities of electrical systems in older buildings and other similar spaces, especially where power-in points are necessarily limited by structural and/or aesthetic considerations. The electrical power system is economical to manufacture, capable of a long operating life, particularly well adapted for the proposed use.

These and other advantages of the invention will be further understood and appreciated by those skilled in the art by reference to the following written specification, claims, and appended drawings.

BRIEF DESCRIPTION OF THE DRAWINGS

FIG. 1 is an exploded perspective view of a multi-tiered electrical system embodying the present invention, as well as an associated furniture unit.

FIG. 2 is a fragmentary vertical cross-sectional view of the electrical system, shown installed in the furniture unit

DETAILED DESCRIPTION OF THE PREFERRED EMBODIMENT

Figure 3:
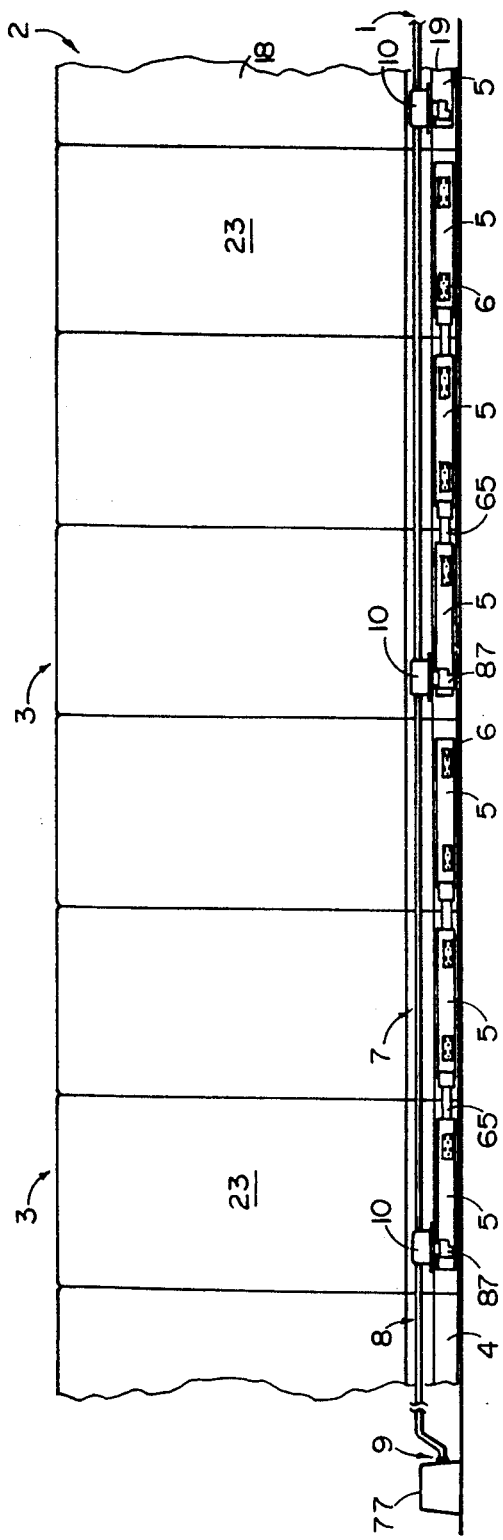
FIG. 3 is a partially schematic, front elevational view of a furniture system with the electrical system installed therein.
Figure 6:
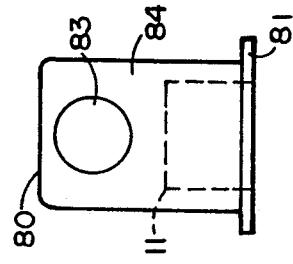
FIG. 6 is an end elevational view of the connector box.
Figure 5:
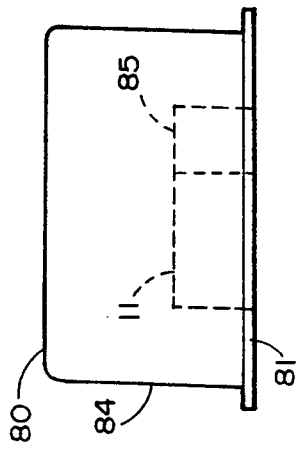
FIG. 5 is a side elevational view of the connector box.
Figure 4:
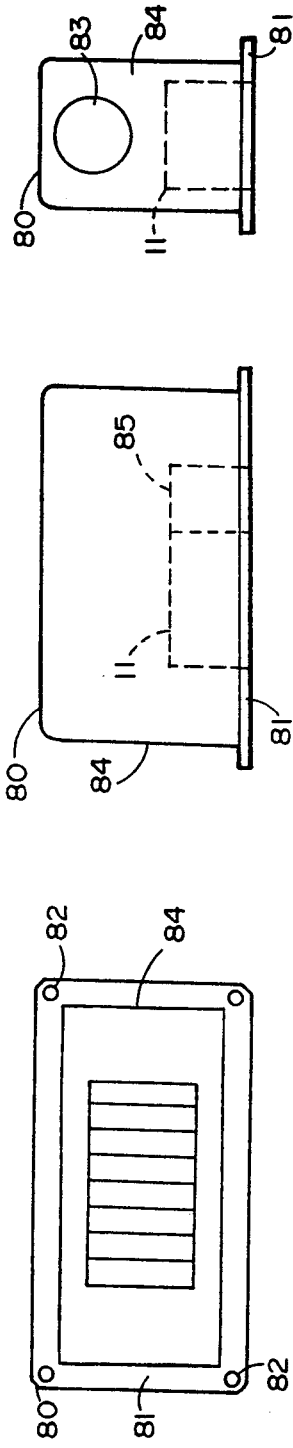
FIG. 4 is a top plan view of a shielded connector box portion of the electrical system.

For purposes of description herein, the terms "upper", "lower," "right," "left," "rear," "front," "vertical," "horizontal," and derivatives thereof shall relate to the invention as oriented in FIGS. 1 and 3. However, it is to be understood that the invention may assume various alternative orientations and step sequences, except where expressly specified to the contrary It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a multi-tiered electrical system embodying the present invention. Electrical system 1 is particularly adapted for use in conjunction with furniture arrangements and the like, such as systems furniture, freestanding modular furniture, and the illustrated panel system 2 (FIG. 3), which includes a plurality of individual panels 3 interconnected in a side-by-side relationship. A branch raceway 4 (FIG. 1) extends along each partition panel 3, and houses therein an associated branch powerway 5, which is connected with adjacent branch powerways to create a branch circuit. Power taps or receptacles 6 are connected to the branch circuit to provide conventional low current power to electrical appliances, and the like. A feeder raceway 7 is also provided in each partition panel 3, positioned adjacent branch raceway 4, and houses therein a feeder harness 8 that is connected by a power-in connector 9 to a source of high current electrical power. A power jumper 10 interconnects feeder harness 8 with one of the branch powerways 5, such that multiple branch circuits can be powered by a single power-in connector 9 through feeder harness 8, thereby greatly reducing the number of requisite power-in points The illustrated partition panel 3 (FIGS. 1 & 2) has a generally rectangular front elevational configuration, comprising an upper portion 18, and a lower base portion 19. The upper portion 18 of partition panel 3 is defined by a marginal upper edge 20, a lower edge 21 and opposite side edges 22. Preferably, partition panel upper portion 18 has an acoustical interior construction (not shown) enclosed by a pair of decorative outer faces or covers 23, which may include wood, synthetic laminates, upholstery, or the like.

The base portion 19 (FIGS. 1 & 2) of partition panel 3 is positioned directly below the upper portion 18 thereof, and supports panel 3 freestanding on a floor surface. In the illustrated example, panel base portion 19 includes a pair of vertical legs 24 and 25, which have their upper ends 26 fixedly mounted in panel upper portion 18, and their lower ends 27 provided with vertically adjustable glides or feet 28. Two horizontally extending plates or trays 29 and 30 are mounted on panel legs 24 and 25 in a vertically stacked relationship, and serve to in part define branch raceway 4 and feeder raceway 7. Both upper and lower trays 29 and 30 extend horizontally to the opposite side edges 22 of panel upper portion 18, and are arranged in a generally parallel relationship with the lower edge 21 thereof. In the illustrated example, feeder raceway 7 extends along and immediately above branch raceway 4 to facilitate interconnecting power jumpers 10 therebetween It is to be understood that the term "raceway", as used herein, also includes other structural arrangements which serve to form a channel or conduit for utilities, including cable and power lines, and that the relative position of raceways 4 & 7 could be reversed.

As best illustrated in FIG. 2, panel legs 24 and 25 each have a double recessed or offset side elevational configuration, comprising inclined portions 31 and 32 connected with rear wall portions 33 and 34, which are specially shaped so as to prevent the panel legs 24 and 25 from interfering with free access through associated raceways 4 and 7. Lower tray 30 (FIGS. 1 & 2) of panel base 19 includes a pair of clips 35 mounted thereon, with tabs 36 that extend laterally outwardly on opposite sides of partition panel 3. A pair of branch raceway covers 37 are provided to selectively enclose the opposite sides of branch raceway 4, and extend horizontally between the opposite ends of upper and lower trays 29 and 30, and vertically between the same. Branch raceway covers 37 are detachably mounted to panel base 19 by clip tabs 36, and can be readily removed therefrom to access the branch powerways 5.

The illustrated upper tray 29 (FIGS. 1 & 2) of panel base 19 includes a cutout 44 through one side edge thereof, so as to form a vertical passageway between branch raceway 4 and feeder raceway 7. Fastener apertures 45 are positioned adjacent cutout 44, and serve to mount thereon an associated power jumper 10, as described in greater detail hereinafter. Cutout 44 is preferably covered by a knockout or removable cover plate when not being used with a power jumper 10, so as to maintain isolation within raceways 4 and 7. A pair of feeder raceway covers 46 are provided to selectively enclose the opposite sides of feeder raceway 7, and extend horizontally between the opposite ends of upper tray 29, and vertically between upper tray 29 and the lower edge 21 of panel upper portion 18. Fasteners 47 detachably mount feeder raceway covers 46 to panel base 19, so as to provide access to feeder harness 8, as described in greater detail hereinafter. Preferably, fasteners 47 are of the type which require a tool from removal, such as the slotted head screws illustrated, so as to provide electrical safety, and avoid inadvertent opening of feeder raceway 7.

Branch powerway 5 (FIGS. 1 & 2) is preferably a modular unit which is received in the branch raceway 4 of an associated partition panel 3, and is adapted to quickly interconnect with adjacent like branch powerways 5. The illustrated branch powerway 5 comprises a unique construction, which is fully disclosed in U.S. Pat. No. 5,092,786 dated Mar. 3, 1992 to Juhlin et al, which is commonly assigned, and hereby incorporated herein by reference. The illustrated branch powerway 5 includes a housing 50 shaped to be received within the branch raceway 4 of an associated partition panel 3. A power terminal 51 is mounted in one end of housing 55, and includes multiple sets of quick-disconnect power connectors 56 through 59. positioned on the opposite faces thereof. Power connectors 57 and 58 are configured to separably mate with receptacles 6. A flexible flag connector 60 is mounted at the end of power terminal 56, and includes a flag terminal 61. A receptacle-only terminal 62 is mounted at the opposite end of housing 55, and includes two sets of quick-disconnect power connectors 63 and 64 on opposite faces thereof in which receptacles 6 can be received A flag connector 65 is mounted on the end of receptacle-only terminal 62, and includes a flag terminal 66 with a set of quick-disconnect power connectors that separably mate with the quick-disconnect power connectors 56 and 59 on the power terminal 56 of an adjacent branch powerway 5 to electrically interconnect the same.

With reference to FIG. 2, each branch powerway 5 includes a plurality of electrical conductors 70 extending between opposite ends thereof, which are adapted to carry conventional low current electrical power therein for office appliances, and the like. For purposes herein, the term "low current electrical power" refers to conventional power for standard appliances, such as typewriters, dictation equipment, personal computers, etc., such as a typical 110 Volt AC, 15-20 amp line. In the illustrated example of branch powerway 5, eight conductors 70 are provided, and arranged to provide three power circuits, with common neutral and ground wires with a maximum of 20 amp, 110 Volt AC per circuit. Other forms and configurations of branch circuits and/or powerways are also contemplated by the present invention.

Feeder harness 8 (FIGS. 1 & 2) comprises a plurality of feeder conductors 75 configured to provide at least one high current circuit that supplies power to the various branch circuits. The illustrated feeder harness 8 includes a shielded cable 76 which extends through the feeder raceway 7 in panel system 2. One end of cable 76 is connected with power-in connector 9, which is in turn connected with a source of high current electrical power from the building supply, or the like. The illustrated power-in connector 9 comprises a hard wired connection with the building source at a floor post or tombstone 77. A conventional top power-in arrangement (not shown), or other similar arrangement may also be provided to operably connect one end of feeder harness 8 to a source of high current electrical power. For purposes herein, the term "high current electrical power" refers to the power in a feeder circuit with overcurrent protection greater than 20 amps, such that the circuit would not qualify as a general purpose branch circuit under the National Electric Code, by virtue of the rating of the overcurrent protector.

Cable 76 includes a feeder harness 8 at each location in which a new low current circuit is required for branch powerways 5. In the example illustrated in FIG. 3, a single feeder harness 8 provides electrical power to three sets of branch powerways 5, wherein each set includes three separate branch powerways 5. Three power jumpers 10 are required in this configuration, wherein each has a substantially identical construction, as described in greater detail below. Where longer runs of panels 3 are provided, feeder hardness 8 may have two high current circuits, which are individually tapped at various points therealong by power jumpers 10 to provide electrical power to multiple sets of branch powerways 5 through a single power-in point or connector 9. Also, feeder harness 8 may have a modular construction (not shown) similar to that o branch powerways 5.

With reference to FIGS. 3–6, each power jumper 10 is an assembly which includes a shielded connecter box 80 having a marginal base flange 81 with fastener apertures 82 therethrough that mate with apertures 45 in upper tray 29 to securely fasten the connector box thereto by suitable fasteners (not shown). Knockout plugs 83 are provided in the opposite end walls 84 of connector box 80, through which feeder harness cable 76 is received. Connector box 80 houses an overcurrent protection device, such as the illustrated conventional circuit breaker 85, and may also optionally house a conventional transformer 11, as discussed in greater detail below. Power jumper assembly 10 also includes a jumper harness 86 (FIGS. 1 & 2), which has one end thereof electrically connected with circuit breaker 85 in connector box 80, and has a quick-disconnect connector 87 mounted on the free end thereof to mate with connectors 56–59 on the power terminal 56 of an associated branch powerway 5. Jumper harness 86 is preferably flexible, and is received in, and extends through the cut out 44 in upper raceway tray 29, between branch raceway 4 and feeder raceway 7.

The feeder circuit serves to locate high current electrical power directly in the panel system, so as to greatly reduce the number of individual wires or conduits running between the building power source and any given furniture arrangement. As noted above, the feeder circuit may take the form of a 110 VAC arrangement with a relatively high amp service, such as 100 amp, 80 amp, 60 amp, etc. In these cases, each power jumper 10 need only be provided with an appropriate overcurrent protection device, such as 20 amp circuit breaker 85 which makes the subsequent or downstream portion of the branch circuit conform to certain National Electrical Code rules and definitions. In accordance with these rules and definitions, a multiplicity of such connectors may be used to power a multiplicity of such branch circuits from a single power-in connector and feeder harness. In some special circumstances, the feeder circuit may take the form of a 220 VAC arrangement, in which case, each power jumper 10 also requires a transformer 11. In either case, the feeder circuit greatly simplifies the wiring necessary to provide adequate power to a selected furniture system.

In operation, multi-tiered electrical system 1 is installed in panel system 2 in the following fashion. With reference to FIG. 3, branch powerways 5 are first installed in the adjacent branch raceways 4 of partition panels 3, and interconnected in the manner described above. Panel system 2 is configured in accordance with the workstations desired, which in the example illustrated in FIG. 3, includes three separate circuits to provide adequate power to the various workstations. Each of the three circuits is supplied by a single high current power source from power-in connector 9 through feeder harness 8. The first panel in each of the three circuit sets is provided with a power jumper 10. A connector box 80 is mounted to the upper tray 29 thereof adjacent cutout 44. Feeder harness cable 76 is electrically connected at tombstone 77 to the building source (i.e. 100 amp, 80 amp, 60 amp, etc.) by power connector 9, and is electrically connected with each of the power jumpers 10. For each power jumper 10, the connector 87 on jumper harness 86 is attached to one of the connectors 56–59 on the power terminal 56 of the associated branch powerway 5. In the special case of voltage transformed power, the transformer 11 of each power jumper 10 provides the associated branch powerway circuit with a maximum of 20 amps of 110 Volt AC electrical power, which is in turn regulated through the associated circuit breaker 85.

The multi-tiered electrical system 1 thereby reduces the number of requisite power-in points with the building source to improve ease of installation and reduce associated costs, without any reduction of power capabilities. Multi-tiered electrical system 1 is particularly beneficial in upgrading the electrical power capabilities of systems in older buildings and other spaces, especially where power-in points must be limited by structural and/or aesthetic considerations.

In the foregoing description, it will be readily appreciated by those skilled in the art that modifications may be made to the invention without departing from the concepts disclosed herein. Such modifications are to be considered as included in the following claims, unless the claims by their language expressly state otherwise.

The embodiments of the invention in which an exclusive property or privilege is claimed are defined as follows:

1. In a furniture system of the type having a plurality of individual furniture units interconnected side-by-side in a predetermined arrangement, the improvement of a multi-tiered electrical system, therefor comprising:

a branch raceway extending along each of said furniture units, and being accessible at opposite ends thereof;

a plurality of modular branch powerways received in said branch raceway of at least selected ones of said furniture units, and wherein each of said branch powerways includes;

electrical conductors extending between opposite ends of the associated branch powerway, and carrying conventional low current electrical power therebetween;

first and second quick-disconnect power connectors electrically connected with said electrical conductors, and positioned adjacent to the opposite ends of the associated branch powerway;

at least one power tap electrically connected with said electrical conductors, and adapted to tap the conventional low current electrical power therefrom to operate electric appliances;

means for detachably interconnecting said first and second quick-disconnect power connectors on adjacent branch powerways to create a branch circuit in said furniture system;

a feeder raceway extending along each of said furniture units, and being accessible at opposite ends thereof;

a feeder harness received in said feeder raceway of said furniture units, and wherein said feeder harness includes:

electrical conductors extending between opposite ends of said feeder harness, and carrying high current electrical power therebetween;

a power-in connector connecting the conductors of said feeder harness with a source of high current electrical power to create a feeder circuit;

at least one power jumper having one end thereof electrically connected with the conductors in said feeder harness, and an opposite end thereof connected with the conductors in one of said branch powerways, whereby multiple branch circuits can be powered by a single power-in connector through said feeder circuit.

2. A furniture system as set forth in claim 1, wherein:
said feeder harness includes a shielded connector box that is positioned in said feeder raceway, and in which said feeder harness electrical conductors and said power jumper one end are interconnected.

3. A furniture system as set forth in claim 2, wherein:
said power jumper includes means for overcurrent protection.

4. A furniture system as set forth in claim 3, wherein:
said overcurrent protection means is positioned within said connector box.

5. A furniture system as set forth in claim 4, wherein:
said feeder raceway is positioned immediately above said branch raceway in each of said furniture units.

6. A furniture system as set forth in claim 5, wherein:
each said feeder raceway includes at least one removable cover for ready access thereto, wherein said cover is connected therewith by fasteners which require a tool for removal so as to provide electrical safety.

7. A furniture system as set forth in claim 6, including:
at least one vertical passageway extending between said branch raceway and said feeder raceway, and receiving said power jumper therethrough.

8. A furniture system as set forth in claim 7, wherein:
each of said furniture units includes said vertical passageway extending between said branch raceway and said feeder raceway, with a removable closure normally covering the same.

9. A furniture system as set forth in claim 8, wherein:
said branch powerways each include a quick-disconnect power-in connector; and said power jumper opposite end includes a quick-disconnect connector shaped to mate with said quick-disconnect power-in connector.

10. A furniture system as set forth in claim 9, wherein:
said feeder circuit includes at least one 100 amp line; and
said branch circuit includes at least one 20 amp line.

11. A furniture system as set forth in claim 10, including:
a transformer positioned within said connector box.

12. A furniture system as set forth in claim 1, wherein:
said power jumper includes means for overcurrent protection.

13. A furniture system as set forth in claim 1, wherein:
said feeder raceway is positioned immediately above said branch raceway in said furniture units.

14. A furniture system as set forth in claim 1, wherein:
each said feeder raceway includes at least one removable cover for ready access thereto, wherein said cover is connected therewith by fasteners which require a tool for removal so as to provide electrical safety.

15. A furniture system as set forth in claim 1, including:
at least one vertical passageway extending between said branch raceway and said feeder raceway, and receiving said power jumper therethrough.

16. A furniture system as set forth in claim 1, wherein:
each of said furniture units includes a vertical passageway extending between said branch raceway and said feeder raceway, with a removable closure normally covering the same.

17. A furniture system as set forth in claim 1, wherein:
said branch powerways each include a quick-disconnect power-in connector; and
said power jumper opposite end includes a quick-disconnect connector shaped to mate with said quick-disconnect power-in connector.

18. A furniture system as set forth in claim 1, wherein:
said feeder circuit includes at least one 100 amp line; and
said branch circuit includes at least one 20 amp line.

19. A furniture system as set forth in claim 1, including:
a transformer positioned within said feeder raceway.

20. A multi-tiered electrical system for furniture systems of the type having a plurality of individual furniture units interconnected side-by-side in a predetermined arrangement, said electrical system comprising:

a branch raceway shaped to extend along each of the furniture units, and being accessible at opposite ends thereof;

a plurality of modular branch powerways received in said branch raceway of at least selected ones of the furniture units, and wherein each of said branch powerways includes:

electrical conductors extending between opposite ends of the associated branch powerway, and carrying conventional low current electrical power therebetween;

first and second quick-disconnect power connectors electrically connected with said electrical conductors, and positioned adjacent to the opposite ends of the associated branch powerway;

at least one power tap electrically connected with said electrical conductors, and adapted to tap the conventional low current electrical power therefrom to operate electric appliances;

means for detachably interconnecting said first and second quick-disconnect power connectors on adjacent branch powerways to create a branch circuit in the furniture system;

a feeder raceway shaped to extend along each of the furniture units, and being accessible at opposite ends thereof;

a feeder harness received in said feeder raceway of the selected furniture units, and wherein said feeder harness includes:

electrical conductors extending between opposite ends of said feeder harness, and carrying high current electrical power therebetween;

a power-in connector connecting the conductors of said feeder harness with a source of high current electrical power;

at least one power jumper having one end thereof electrically connected with the conductors in said feeder harness, and an opposite end thereof connected with the conductors in one of said branch powerways, whereby multiple branch circuits can be powered by a single power-in connector through said feeder circuit.

21. A multi-tiered electrical system as set forth in claim 20, wherein:
said feeder harness includes a shielded connector box that is positioned in said feeder raceway, and in which said feeder harness electrical conductors and said power jumper one end are interconnected.

22. A multi-tiered electrical system as set forth in claim 21, wherein:
said power jumper includes means for overcurrent protection.

23. A multi-tiered electrical system as set forth in claim 22, wherein:
said overcurrent protection means is positioned within said connector box.

24. A multi-tiered electrical system as set forth in claim 23, wherein:
said feeder raceway is positioned immediately above said branch raceway.

25. A multi-tiered electrical system as set forth in claim 24, wherein:
each said feeder raceway includes at least one removable cover for ready access thereto, wherein said cover is connected therewith by fasteners which require a tool for removal so as to provide electrical safety.

26. A multi-tiered electrical system as set forth in claim 25, including:
at least one vertical passageway extending between said branch raceway and said feeder raceway, and receiving said power jumper therethrough.

27. A multi-tiered electrical system as set forth in claim 26, wherein:
each of said furniture units includes said vertical passageway extending between said branch raceway and said feeder raceway, with a removable closure normally covering the same.

28. A multi-tiered electrical system as set forth in claim 27, wherein:
said branch powerways each include a quick-disconnect power-in connector; and
said power jumper opposite end includes a quick-disconnect connector shaped to mate with said quick-disconnect power-in connector.

29. A multi-tiered electrical system as set forth in claim 28, wherein:
said feeder circuit includes at least one 100 amp line; and
said branch circuit includes at least one 20 amp line.

30. A multi-tiered electrical system as set forth in claim 29, including:
a transformer positioned within said connector box.

* * * * *